(12) United States Patent
Ikram

(10) Patent No.: US 8,045,661 B2
(45) Date of Patent: Oct. 25, 2011

(54) SYSTEM AND METHOD FOR BLIND IDENTIFICATION OF MULTICHANNEL FINITE IMPULSE RESPONSE FILTERS USING AN ITERATIVE STRUCTURED TOTAL LEAST-SQUARES TECHNIQUE

(75) Inventor: Muhammad Z. Ikram, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 603 days.

(21) Appl. No.: 12/188,646

(22) Filed: Aug. 8, 2008

(65) Prior Publication Data
US 2009/0196386 A1 Aug. 6, 2009

Related U.S. Application Data

(60) Provisional application No. 61/026,040, filed on Feb. 4, 2008.

(51) Int. Cl.
*H04B 1/10* (2006.01)
(52) U.S. Cl. ........ 375/350; 375/260; 375/316; 375/324; 375/349
(58) Field of Classification Search .................. 375/350, 375/240.25, 324, 316, 260, 349
See application file for complete search history.

(56) References Cited

U.S. PATENT DOCUMENTS

| 6,990,061 | B2 * | 1/2006 | Deneire et al. ................. 370/210 |
| 7,383,178 | B2 * | 6/2008 | Visser et al. .................. 704/227 |

OTHER PUBLICATIONS

Lang Tong, et al., "A New Approach to Blind Identification and Equalization of Multipath Channels" IEEE, pp. 856-860, 1991.
Yingbo Hua, "Fast Maximum Likelihood for Blind Identification of Multiple FIR Channels" IEEE Transactions on Signal Processing, vol. 44, No. 3, pp. 661-672, Mar. 1996.
Guanghan Xu, et al., "A Least-Squares Approach to Blind Channel Identification" IEEE Transactions on Signal Processing, vol. 43, No. 12, pp. 2982-2993, Dec. 1995.
Jacob H. Gunther, et al., "A Structured Least-Squares Approach to Blind Channel Identification and Equalization" Proc. 37th Asilomar Conf. Signals, Syst. Comp., pp. 45-49, 2003.
Theagenis J. Abatzoglou, et al., "The Constrained Total Least Squares Technique and Its Applications to Harmonic Superresolution" IEEE Transactions on Signal Processing, vol. 39, No. 5, pp. 1070-1087, May 1991.
Bart De Moor, "Total Least Squares for Affinely Structured Matrices and the Noisy Realization Problem" IEEE Transactions on Signal Processing, vol. 42, No. 11, pp. 3104-3113, Nov. 1994.

* cited by examiner

*Primary Examiner* — Ted Wang
(74) *Attorney, Agent, or Firm* — Ronald O. Neerings; Wade James Brady, III; Frederick J. Telecky, Jr.

(57) ABSTRACT

A system for, and method of, blind identification of multichannel finite impulse response filters. In one embodiment, the system includes: (1) a decomposition generator configured to construct, from noisy symbols containing data, a block-Hankel structured matrix and a decomposition thereof, (2) an iterative matrix re-estimator coupled to the decomposition generator and configured iteratively to re-estimate singular vectors corresponding to a scalar that satisfies the block-Hankel matrix until a sufficient convergence occurs, (3) a structured low-rank estimate matrix generator coupled to the iterative matrix re-estimator and configured to generate a block-Hankel structured low-rank estimate matrix related to the block-Hankel structured matrix and (4) an STLS channel estimator coupled to the structured low-rank estimate matrix generator and configured to obtain STLS channel estimates from the block-Hankel structured low-rank estimate matrix.

20 Claims, 4 Drawing Sheets

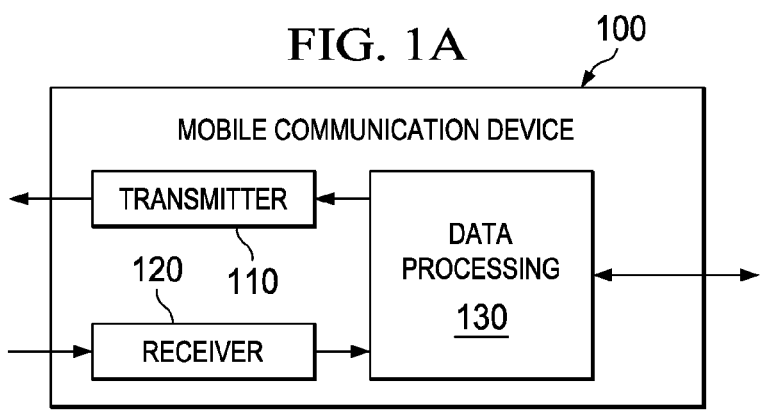
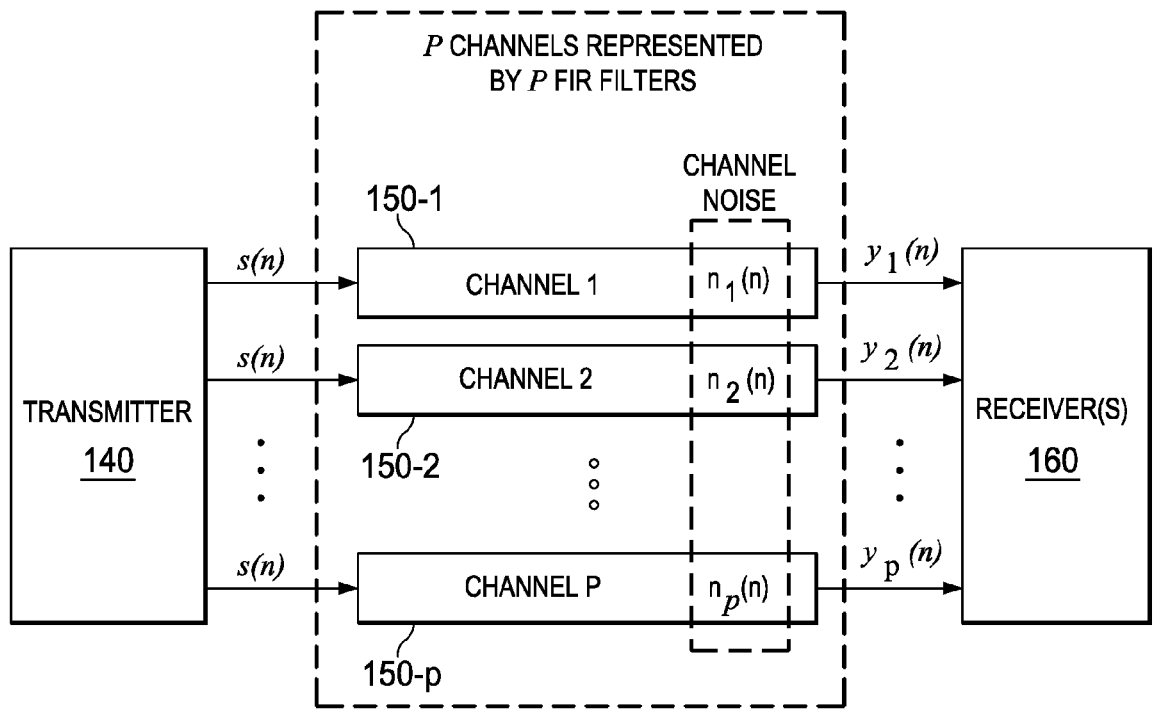

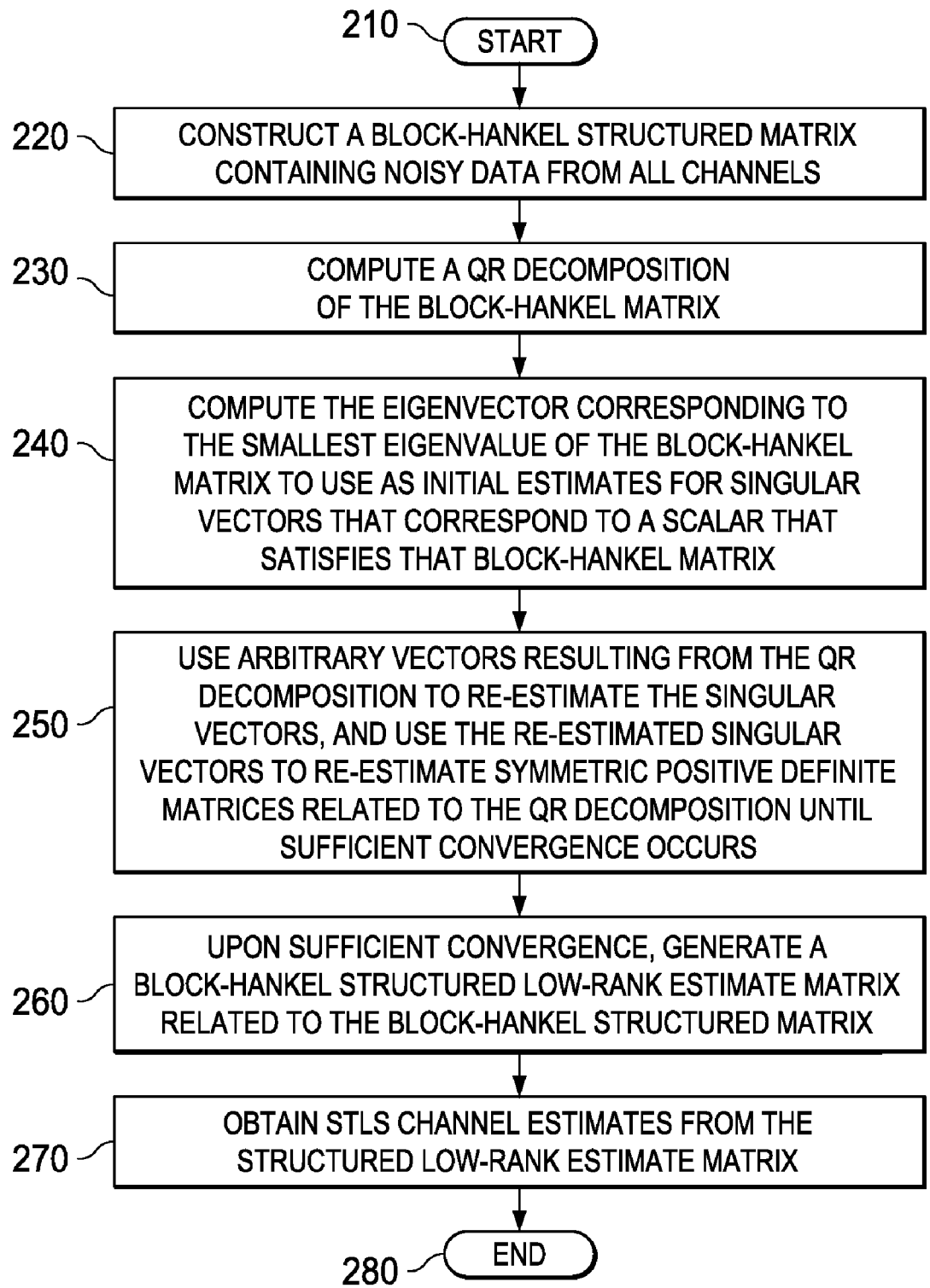

US 8,045,661 B2

SYSTEM AND METHOD FOR BLIND IDENTIFICATION OF MULTICHANNEL FINITE IMPULSE RESPONSE FILTERS USING AN ITERATIVE STRUCTURED TOTAL LEAST-SQUARES TECHNIQUE

CROSS-REFERENCE TO PROVISIONAL APPLICATION

This application claims the benefit of U.S. Provisional Application Ser. No. 61/026,040, filed by Ikram on Feb. 4, 2008, entitled "Method for Blind Identification of Multichannel FIR Filters Using Structured Total Least-Squares," commonly assigned with the invention and incorporated herein by reference.

TECHNICAL FIELD OF THE INVENTION

The invention is directed, in general, to wireless communications and, more specifically, to a system and method for blind identification of multichannel finite impulse response (FIR) filters using an iterative structured total least-squares technique.

BACKGROUND OF THE INVENTION

Blind channel identification (BCI) refers to the estimation of channel impulse response from only its output. Over the past few years, this area of research has received immense practical interest (see, e.g., Tong, et al., "Multichannel Blind Identification: From Subspace to Maximum Likelihood Methods," Proc. IEEE, vol. 86, no. 10, pp. 1951-1968, October 1998, and references therein). The primary reason for this is the fact that BCI does not require a training sequence to equalize the channel, thereby saving the channel capacity, which is severely limited in mobile communications. Some early research in this direction focused on using higher-order statistics (HOS), which require the use of long data records for reliable estimates. This limits their usage in mobile communications where the channel is desired to be estimated within a short period of time.

Blind estimation of FIR channels using only second-order statistics (SOS) is first attributed to Tong, et al., who showed that by sampling the received data at a rate higher than the baud (symbol) rate, SOS can suffice to estimate the channel impulse response up to a constant (Tong, et al., "A New Approach to Blind Identification and Equalization of Multipath Channels," in Proc. $25^{th}$ Asilomar Conf. Signals, Syst. Comp., 1991, pp. 856-860). Since then, many different statistical and deterministic approaches for BCI have been studied, each having its own relative merits and demerits (e.g., Tong, et al., "Multichannel . . . ," supra).

SUMMARY OF THE INVENTION

One aspect of the invention provides a system for blind identification of multichannel FIR filters. In one embodiment, the system includes: (1) a decomposition generator configured to construct, from noisy symbols containing data, a block-Hankel structured matrix and a decomposition thereof, (2) an iterative matrix re-estimator coupled to the decomposition generator and configured iteratively to re-estimate singular vectors corresponding to a scalar that satisfies the block-Hankel matrix until a sufficient convergence occurs, (3) a structured low-rank estimate matrix generator coupled to the iterative matrix re-estimator and configured to generate a block-Hankel structured low-rank estimate matrix related to the block-Hankel structured matrix and (4) an STLS channel estimator coupled to the structured low-rank estimate matrix generator and configured to obtain STLS channel estimates from the block-Hankel structured low-rank estimate matrix.

Another aspect of the invention provides a method of blind identification of multichannel finite impulse response filters. In one embodiment, the method includes: (1) constructing a block-Hankel structured matrix and a decomposition thereof from noisy symbols containing data, (2) iteratively re-estimating singular vectors corresponding to a scalar that satisfies the block-Hankel matrix until a sufficient convergence occurs, (3) generating a block-Hankel structured low-rank estimate matrix related to the block-Hankel structured matrix and (4) obtaining STLS channel estimates from the block-Hankel structured low-rank estimate matrix.

In another embodiment, the method includes: (1) computing a decomposition of a block-Hankel structured matrix containing noisy data from multiple channels, (2) computing an eigenvector corresponding to the smallest eigenvalue of the block-Hankel matrix to yield initial estimates for singular vectors corresponding to a scalar that satisfies the block-Hankel matrix, (3) using re-estimated singular vectors to re-estimate symmetric positive definite matrices related to the decomposition until sufficient convergence occurs and (4) generating a block-Hankel structured low-rank estimate matrix related to the block-Hankel structured matrix.

BRIEF DESCRIPTION OF THE DRAWINGS

For a more complete understanding of the invention, reference is now made to the following descriptions taken in conjunction with the accompanying drawings, in which:

FIG. 1A is a block diagram of a mobile communication device within which a system for, or method of, blind identification of multichannel FIR filters using an iterative STLS-based technique constructed, or carried out, according to the principles of the invention can operate;

FIG. 1B is a schematic diagram illustrating wireless multichannel communication between a transmitter and a receiver;

FIG. 2 is a flow diagram of one embodiment of a method of blind identification of multichannel FIR filters using an iterative STLS-based technique carried out according to the principles of the invention;

DETAILED DESCRIPTION

1. Introduction

Figure 3:
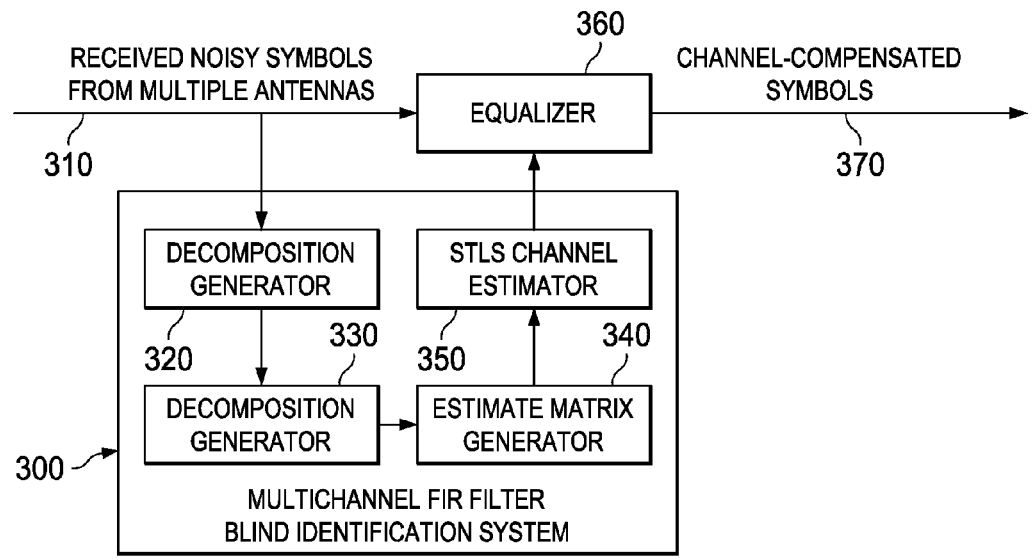
FIG. 3 is a block diagram of one embodiment of a system for blind identification of multichannel FIR filters using an iterative STLS-based technique constructed according to the principles of the invention.

Described herein are iterative STLS-based techniques for performing BCI without assuming any knowledge of the input signal statistics. This is particularly realistic in mobile communications, where a short data sequence may not yield reliable statistics (see, e.g., Hua, "Fast Maximum Likelihood for Blind Identification of Multiple FIR Channels," IEEE Trans. Signal Processing, vol. 44, no. 3, pp. 661-672, March 1996). A deterministic least-squares (LS) technique was proposed in Xu, et al., "A Least-Squares Approach to Blind Channel Identification," IEEE Trans. Signal Processing, vol. 43, no. 12, pp. 2982-2993, December 1995, which is based on the cross-relation property between the outputs of two channels fed by the same input. A striking feature of the LS technique is that for an arbitrary input and in the absence of noise, it yields exact channel estimates. In the presence of noise, the channel parameter estimates are obtained by solving an over-determined set of linear equations which translates to obtaining a reduced rank solution of a block-Hankel structured matrix. Unfortunately, in the presence of noise, the LS technique fails to associate this specific structure with the reduced rank matrix. In the discussion herein, the LS solution is constrained so that the reduced rank data matrix also assumes a block-Hankel structure.

This constrained optimization problem is referred to as structured total least-squares (STLS). STLS provides an advantageous framework for approximating a full-rank affinely-structured matrix with a rank-deficient matrix having the same affine structure. STLS is not new in itself. However, various prior art attempts to employ STLS have either fallen short by failing to provide structured constraint (see, e.g., Gunther, et al., "A Structured Least-Squares Approach to Blind Channel Identification and Equalization," in Proc. 37$^{th}$ Asilomar Conf. Signals, Syst. Comp., 2003, pp. 45-49)) or requiring the simultaneous solution of a set of nonlinear equations.

Described herein is an iterative STLS-based BCI technique for estimating channel parameters. The novel iterative technique both provides structured constraint and obviates the need to solve simultaneous nonlinear equations. The block-Hankel affine structure of the data matrix, which empowers STLS-based techniques in general, will first be fully exploited. An iterative nonlinear solution to the unknown channel parameters is then derived by using a generalized form of singular value decomposition (SVD). Extensive numerical simulations are then carried out to compare the performance of the iterative STLS-based BCI technique against the well-known LS technique, where the affine structure of the date matrix is overlooked. These results reveal that the iterative STLS-based BCI technique outperforms the LS technique for both well-conditioned and ill-conditioned channels over a wide range of signal-to-noise ratio (SNR).

2. Problem Formulation

FIG. 1A is a block diagram of a mobile communication device 100 within which a system for, or method of, blind identification of multichannel FIR filters using an iterative STLS-based BCI technique constructed, or carried out, according to the principles of the invention can operate. The mobile communication device 100 contains a transmitter 110 configured to transmit symbols bearing data to other mobile communication devices (not shown) and a receiver 120 configured to receive symbols bearing data from other mobile communication devices (not shown).

The mobile communication device 100 also contains data processing circuitry 130 coupled to the transmitter 110 and the receiver 120 and configured to queue data for transmission, buffer received data and otherwise manipulate data for the benefit of a user (not shown). The data processing circuitry 130 may be employed to carry out various embodiments of the iterative STLS-based technique claimed herein. Thus, the iterative STLS-based technique may be embodied in a sequence of executable software instructions. A keyboard, keypad, microphone, touch-sensitive screen or other input device (not shown) may be associated with the data processing circuitry 130 and configured to accept input from a user (not shown). A screen, speaker, vibrator or other output device (not shown) may also be associated with the data processing circuitry 130 and configured to provide output to a user (not shown).

FIG. 1B is a schematic diagram illustrating wireless multichannel communication between a transmitter 140 and one or more receivers 160 having multiple antennas. P wireless channels 150-1, 150-2, . . . , 150-P bear data from the transmitter 140 to the one or more receivers 160. As shown, the transmitter 140 transmits substantially the same signal s(n) over each of the P wireless channels 150-1, 150-2, . . . , 150-P. Noise $n_1(n)$, $n_2(n)$, . . . , $n_P(n)$ interferes with the respective channels, producing channel-dependent outputs $y_1(n)$, $y_2(n)$, . . . , $y_P(n)$.

FIG. 1B may be modeled as a P-channel FIR system having impulse responses $h_i(n)$, i=1, . . . , P, driven by a common input s(n). The outputs of this multichannel system are given by:

$$y_i(n) = \sum_{l=0}^{L} h_i(l)s(n-l) + n_i(n), \, i = 1, \ldots, P, \quad (1)$$

where L is the order of the P FIR filters, i.e., $$h_i(z) = \sum_{l=0}^{L} h_i(l)z^{-1},$$

assumed to be known. Of course, the P-channel model can be obtained either by using P physical receivers or by oversampling each channel output at P times the baud rate (e.g., Tong, et al., "Multichannel . . . ," supra).

The overall objective of the iterative STLS-based technique is to estimate the channels $h_i(n)$ from N output samples $y_i(n)$ of P channels i=1, . . . , P. For purposes of describing the embodiments expressly set forth herein, the following three identifiability assumptions are made: A(1) the P FIR filters are coprime; i.e., they do not share any common zeros; A(2) the number of modes in the input sequence is L+1, and A(3) the additive noise $n_i(n)$ is stationary and white.

For a pair of noise-free outputs of any two sensors i and j, the following can be written:

$x_i(n)=h_i(n)*s(n)$, and $x_j(n)=h_j(n)*s(n)$, which yields:

$h_i(n)*x_j(n)=h_j(n)*x_i(n)$.

This may be restated in a compact matrix notation:

$$(X_i - X_j)\begin{pmatrix} h_j \\ h_i \end{pmatrix} = 0, \quad (2)$$

where $h_m = [h_m(L), \ldots, h_m(0)]^T$, $$X_m = \begin{pmatrix} x_m(L) & x_m(L+1) & \ldots & x_m(2L) \\ x_m(L+1) & x_m(L+2) & \ldots & x_m(2L+1) \\ \vdots & \vdots & \ddots & \vdots \\ x_m(N-L) & x_m(N-L+1) & \ldots & x_m(N) \end{pmatrix}, \quad (3)$$

and $(\cdot)^T$ denotes the transpose. The cross-relation in Equation (2) is the main idea behind both the LS approach of Xu, et al., supra, and the STLS approach, as will be shown in the next two sections.

3. Motivation for STLS-Based Approach

The cross-relation of Equation (2) can straightforwardly be expressed for each (i,j) pair of channels, which when combined together gives:

$$\begin{pmatrix} X^1 \\ X^2 \\ \vdots \\ X^{P-1} \end{pmatrix} \begin{pmatrix} h_1 \\ h_2 \\ \vdots \\ h_P \end{pmatrix} = 0, \quad (4)$$

or simply $Xh=0$, where $X$ is of dimension $$(N-2L+1)\frac{P(P-1)}{2} \times (L+1)P,$$

and $h$ is a vector of length $(L+1)P$. Each constituent block of $X$ is of dimension $(N-2L+1)(P-i) \times (L+1)P$ and is given by:

$$X^i = \begin{pmatrix} 0 & \ldots & 0 & X_{i+1} & -X_i & 0 & 0 \\ \vdots & & \vdots & & 0 & \ddots & 0 \\ 0 & \ldots & 0 & X_P & 0 & \ldots & -X_i \end{pmatrix}. \quad (5)$$

With the identifiability assumptions (A1)-(A3) satisfied, the matrix $X$, also sometimes referred to as the data selection matrix, is rank-deficient by one, and $h$ is in its null space. Given a noisy data matrix $Y$, an estimate of the channel parameters can then be obtained by finding the low-rank approximation $\hat{Y}$ of the noisy data selection matrix $Y$. In other words, a LS solution as follows is sought:

$$\min \|Y - \hat{Y}\|^2, \text{ subject to } \begin{cases} \hat{Y}h = 0 \\ h^T h = 1, \end{cases} \quad (6)$$

where $\|\cdot\|$ is the Frobenius norm. The first constraint in Equation (6) guarantees the rank-deficiency of $Y$, and the second constraint avoids the trivial solution $h=0$. Using the Eckart-Young-Mirsky theorem (see, e.g., Golub, et al., Matrix Computations, Johns Hopkins University Press, Baltimore, Md., 1996), the LS solution can be obtained from the dyadic SVD of $Y$, i.e.:

$$\hat{Y} = Y - u\sigma v^T, \text{ and } h = v,$$

where $u$ and $v$ are the left and right singular vectors of the matrix $Y$ corresponding to its smallest singular value $\sigma$.

The matrix $Y$ has a unique block-Hankel structure associated with it. However, its low-rank approximant $\hat{Y}$, obtained using Equation (6), is not guaranteed to have the same structure. In the BCI problem, the matrix $\hat{Y}$ is desired to have a block-Hankel structure as in Equation (4). Motivated by this fact, what is needed is an estimate $\hat{Y}$ guaranteed to have the same structure as $Y$. In this case, the solution belongs to a set of matrices S, which satisfies the following property:

$$S = \hat{Y}, \text{ given } \begin{cases} \hat{Y}h = 0 \\ \hat{Y} \text{ has the same block-Hankel structure as } Y. \end{cases}$$

By adding another constraint, the optimization problem can no longer be solved simply using SVD. In fact, as will be shown below, a nonlinear estimation procedure is required to solve this problem.

4. Iterative STLS-Based BCI

For the sake of simplicity, a two-channel case, i.e., P=2, will be considered. The matrix $X$, therefore, consists of only two row sub-blocks $X_2$ and $-X_1$ and is a function of $2(N-L+1)$ data values $x_i(L), \ldots, x_i(N)$ for $i=1,2$. In terms of a set of fixed matrices $B_i$, $i=0, \ldots, 2N-2L+1$, this affine matrix can be expressed as:

$$B(x) = X = x_2(L)B_0 + x_2(L+1)B_1 + \ldots + x_2(N)B_{N-L} + x_1(L)B_{N-L+1} + \ldots + x_1(N)B_{2N+2L+1} \quad (7)$$

where $B_i$ (i=0, \ldots, N-L+1) has a one along the $(i+1)^{th}$ anti-diagonal of the left $(N-2L+1) \times (L+1)$ block and zeros elsewhere. Similarly, $B_i$ (i=N-L+2, \ldots, 2N-2L+1) has a minus one along the $(i+1)^{th}$ anti-diagonal of the right $(N-2L+1) \times (L+1)$ block and zeros elsewhere. For example:

$$B_1 = \begin{pmatrix} 0 & 1 & \ldots & 0 & | & 0 & 0 & \ldots & 0 \\ 1 & 0 & \ldots & 0 & | & 0 & 0 & \ldots & 0 \\ \vdots & \vdots & \ddots & \vdots & | & \vdots & \ddots & \vdots \\ 0 & 0 & \ldots & 0 & | & 0 & 0 & \ldots & 0 \\ \underbrace{\phantom{XXXX}}_{(L+1)} & & & & \underbrace{\phantom{XXXX}}_{(L+1)} & & \end{pmatrix} \Big\} (N-2L+1).$$

Based on the above formulation, and given the noisy data $y_i(n)$, an STLS criteria is defined to estimate the block-Hankel structured matrix $B(\hat{y})$, which consists of minimizing the following cost function:

$$\min_{\hat{y}_1(i), \hat{y}_2(i), h} \sum_{i=L}^{N} \{[y_1(i) - \hat{y}_1(i)]^2 + [y_2(i) - \hat{y}_2(i)]^2\} \quad (8)$$

$$\text{subject to } \begin{cases} B(\hat{y})h = 0 \\ h^T h = 1. \end{cases}$$

Using Lagrange's multipliers, a solution to Equation (8) is obtained by finding vectors u and v corresponding to the smallest scalar $\sigma$ that satisfies Equation (4):

$$Yv = D_v u\sigma, u^T D_v u = 1, \text{ and} \quad (9)$$

$$Y'u = D_u v\sigma, v^T D_u v = 1, \quad (10)$$

where $D_u$ and $D_v$ are symmetric positive definite matrices defined as:

$$\sum_{i=1}^{N-L+1} B_i^T(u^T B_i v)u = D_u v \text{ and } \sum_{i=1}^{N-L+1} B_i(u^T B_i v)v = D_v u. \quad 5$$

The channel estimates are given by $\hat{h}=v/\|v\|$. Note that the nonlinearity of Equations (9) and (10) stems from the dependence of $D_u$ and $D_v$ on the square of the singular vectors u and v, respectively. This makes an analytical solution to Equations (9) and (10) rather difficult to compute. Abatzoglou, et al., "The Constrained Total Least Squares and Its Application to Harmonic Superresolution," IEEE Trans. Signal Processing, vol. 39, no. 5, pp. 1070-1087, May 1991, and De Moor, "Total Least Squares for Affinely Structured Matrices and Noisy Realization Problems," IEEE Trans. Signal Processing, vol. 42, no. 11, pp. 3104-3113, November 1994, propose iterative techniques to solve this nonlinear optimization problem. De Moor's technique, however, possesses better convergence properties. $D_u$ and $D_v$ are treated as independent of u and v in each iteration in which a QR decomposition of Y is computed, i.e.:

$$Y = (Q_1 \quad Q_2)\begin{pmatrix} R \\ 0 \end{pmatrix}, \quad (12)$$

where $Q_1$ is of dimension $(N-2L+1) \times 2(L+1)$, $Q_2$ is of dimension $(N-2L+1) \times (N-1)$ and R is of dimension $2(L+1) \times 2(L+1)$. Equations (9) and (10) can then be manipulated to obtain the following upper triangular form:

$$\begin{pmatrix} R^T & 0 & 0 \\ Q_2^T D_v Q_1 & Q_2^T D_v Q_2 & 0 \\ Q_1^T D_v Q_1 \sigma & Q_1^T D_v Q_2 \sigma & -R \end{pmatrix} \begin{pmatrix} z \\ w \\ v \end{pmatrix} = \begin{pmatrix} D_u v \sigma \\ 0 \\ 0 \end{pmatrix}, \quad (13)$$

where $u = Q_1 z + Q_2 w$ for certain arbitrary vectors z and w of lengths $2(L+1)$ and $(N-1)$, respectively. This set of equations allows one to efficiently compute u and v, which are then used to update $D_u$ and $D_v$ for the next iteration.

The novel iterative STLS-based BCI technique can be summarized as follows:
1. Given the noisy data $y_i(n)$, $n=L, \ldots, N$ for $i=1,2$, construct a block-Hankel structured matrix Y of the form defined in Equation (4).
2. Compute a QR decomposition of Y.

Initialization:
3. Compute an eigenvector corresponding to the smallest eigenvalue of Y as an initial choice for $u^{(0)}$ and $v^{(0)}$. Note that this choice gives the channel estimates in the LS sense.
4. Choose normalized $D_u^{(0)}$ and $D_v^{(0)}$, such that:
$v^{(0)T} D_u^{(0)} v^{(0)} = u^{(0)T} D_v^{(0)} u^{(0)} = 1$.

For $k=1, \ldots,$ compute:

$z^{(k)} = R^{-T} D_u^{(k-1)} v^{(k-1)} \sigma^{(k-1)}$ \hfill 5.

$w^{(k)} = -(Q_2^T D_v^{(k-1)} Q_1)^{-1} (Q_2^T D_v^{(k-1)} Q_1) z^{(k)}$ \hfill 6.

$u^{(k)} = Q_1 z^{(k)} + Q_2 w^{(k)}$ \hfill 7.

$v^{(k)} = R^{-1} Q_1^T D_v^{(k-1)} u^{(k)}$, $v^{(k)} = v^{(k)}/\|v^{(k)}\|$ \hfill 8.

$\gamma^{(k)} = (u^{(k)T} D_v^{(k)} u^{(k)})^{1/4}$ \hfill 9.

$u^{(k)} = u^{(k)}/\gamma^{(k)}$, $v^{(k)} = v^{(k)}/\gamma^{(k)}$ \hfill 10.

$D_u^{(k)} = D_u^{(k)}/(\gamma^{(k)})^2$, $D_v^{(k)} = D_v^{(k)}/(\gamma^{(k)})^2$ \hfill 11.

$\sigma^{(k)} = u^{(k)T} Y v^{(k)}$ \hfill 12.

13. Convergence: If $\|v^{(k)} - v^{(k-1)}\| \leq \epsilon$ (a predetermined scalar), stop. Otherwise, repeat steps 5-13.

At convergence (k=K), the structured low-rank matrix $\hat{Y}$ can be estimated using:

$$B(\hat{y}) = \sum_{i=0}^{N-L} B_i \hat{y}_2^{(K)}(L+i) + \sum_{i=N-L+1}^{2N-2L+1} B_i \hat{y}_1^{(K)}(2L-N-1+i), \quad (14)$$

where $\hat{y}_1^{(K)}(L+i) = y_1(L+i) - u^{(K)T} B_i v^{(K)} \sigma^{(K)}$, and $\hat{y}_2^{(K)}(L+i) = y_2(L+i) - u^{(K)T} B_{N-L+1-i} v^{(K)} \sigma^{(K)}$ for $i=0, \ldots, N-L$. Finally, the STLS channel estimates h are obtained from the null space of $B(\hat{y})$.

The above-described iterative STLS-based technique may be expressed in a flow diagram. FIG. 2 is a flow diagram of one embodiment of a method of blind identification of multichannel FIR filters using an iterative STLS-based technique carried out according to the principles of the invention. The method begins in a start step 210, when it is desired to perform BCI. In a step 220, a block-Hankel structured matrix containing noisy data from all channels is constructed. In a step 230, a QR decomposition of the block-Hankel structured matrix is computed. In a step 240, an eigenvector corresponding to the smallest eigenvalue of the block-Hankel matrix is computed. The eigenvector yields initial estimates for singular vectors that correspond to the smallest scalar that satisfies the block-Hankel matrix. In a step 250, vectors resulting from the QR decomposition are used to re-estimate the singular vectors. The re-estimated singular vectors are then used in turn to re-estimate symmetric positive definite matrices related to the QR decomposition until sufficient convergence occurs. Upon sufficient convergence, in a step 260, a block-Hankel structured low-rank estimate matrix related to the block-Hankel structured matrix is generated. In a step 270, STLS channel estimates are obtained from the block-Hankel structured low-rank estimate matrix. The method ends in an end step 280, having obtained the desired channel estimates.

FIG. 3 is a block diagram of one embodiment of a system for blind identification of multichannel FIR filters using an iterative STLS-based technique constructed according to the principles of the invention. Noisy symbols 310 containing data are received from multiple antennas. The noisy symbols 310 are provided to a decomposition generator 320 configured to use the noisy symbols 310 to construct a block-Hankel structured matrix and a decomposition of the block-Hankel structured matrix. An iterative matrix re-estimator 330 is configured to compute an eigenvector corresponding to the smallest eigenvalue of the block-Hankel matrix to yield initial estimates for singular vectors that correspond to a scalar that satisfies the block-Hankel matrix, use arbitrary vectors resulting from the QR decomposition to re-estimate the singular vectors and use the re-estimated singular vectors in turn to re-estimate symmetric positive definite matrices related to the QR decomposition until sufficient convergence occurs. Upon sufficient convergence, a structured low-rank estimate matrix generator 340 is configured to generate a block-Hankel structured low-rank estimate matrix related to the block-Hankel structured matrix. An STLS channel estimator 350 is configured then to obtain STLS channel estimates from the block-Hankel structured low-rank estimate matrix. An equalizer 360 uses the STLS channel estimates to equalize and therefore remove at least some channel-induced noise from the noisy symbols 310, yielding channel-compensated symbols 370, which are then suitable for further processing.

5. Simulation Results

The performance of the novel iterative STLS-based technique will now be compared against the conventional LS technique. To study the effect of ill-conditioned channels, a two-channel second-order FIR model (L=2, P=2) proposed in Hua, et al., supra, is considered:

$$h_i = [1 - 2\cos(\theta_1) 1]^T, i=1,2,$$

where $\theta_1 = \theta$, $\theta_2 = \theta_1 + \delta$, and $\delta$ is the parameter that controls the angular separation between the zeros of the two channels. The channels are considered ill-conditioned when $\delta$ is small. The input s(n) is considered as an independent and identically distributed (i.i.d.) sequence of (+1,−1) having unit variance $\sigma_s^2 = 1$. The output data consist of N=100 samples. The outputs of the two channels are assumed to be corrupted by additive white Gaussian noise of variance $\sigma_n^2$. The SNR in dB is defined using:

$$SNR = 10\log_{10}\left(\frac{\sigma_s^2 \|h\|^2}{M\sigma_n^2}\right).$$

Figure 4:
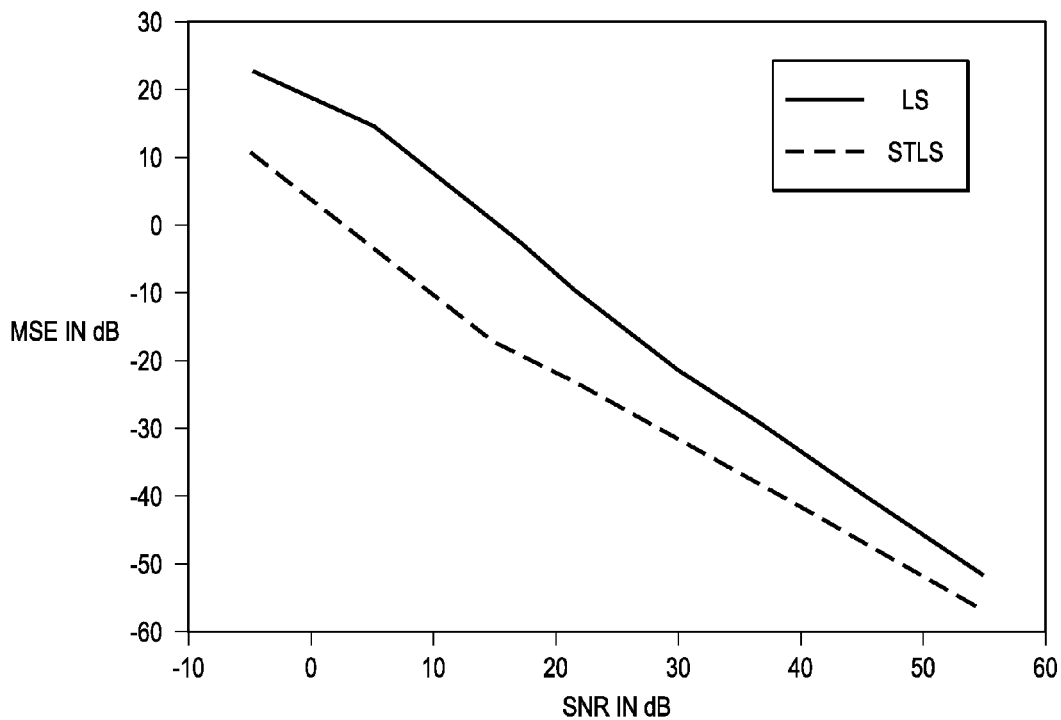
FIG. 4 is a graph showing a performance comparison of LS and STLS techniques for well-conditioned channels ($\theta=\pi/10$, $\delta=\pi$) with data size N=100.

The performance of STLS and LS techniques is evaluated using the mean-squared error (MSE) in dB:

$$MSE = 20\log_{10}\left(\frac{1}{\|h\|}\sqrt{\frac{1}{N_r}\sum_{i=1}^{N_r}\|\hat{h}^i - h\|^2}\right),$$

where $\hat{h}^i$ is the $i^{th}$ estimate of channel parameters, and $N_r$=100 is the number of independent Monte-Carlo runs. To alleviate the effect of scaling in the estimates, the first element of $\hat{h}^i$ is normalized to one. FIG. 4 is a graph showing a performance comparison of LS and STLS techniques for well-conditioned channels ($\theta=\pi/10$, $\delta=\pi$) with data size N=100.

Figure 5:
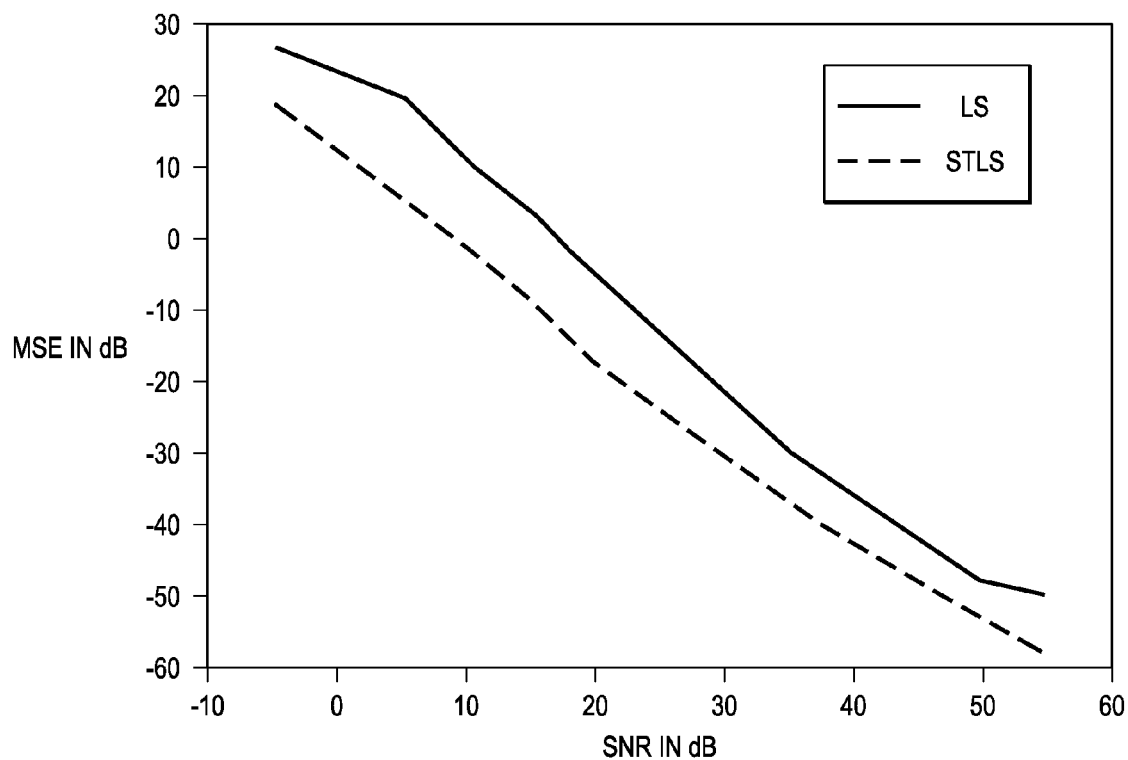
FIG. 5 is a graph showing a performance comparison of LS and STLS techniques for ill-conditioned channels ($\theta=\pi/10$, $\delta=\pi/5$) with data size N=100.

The MSE for ill-conditioned channels ($\theta=\pi/10$, $\delta=\pi/5$) at different SNR levels was computed. FIG. 5 is a graph showing a performance comparison of LS and STLS techniques for ill-conditioned channels ($\theta=\pi/10$, $\delta=\pi/5$) with data size N=100. It is apparent that by preserving the block-Hankel structure of the data matrix in its low-rank approximant, better channel estimates are obtained in terms of MSE.

Figure 6:
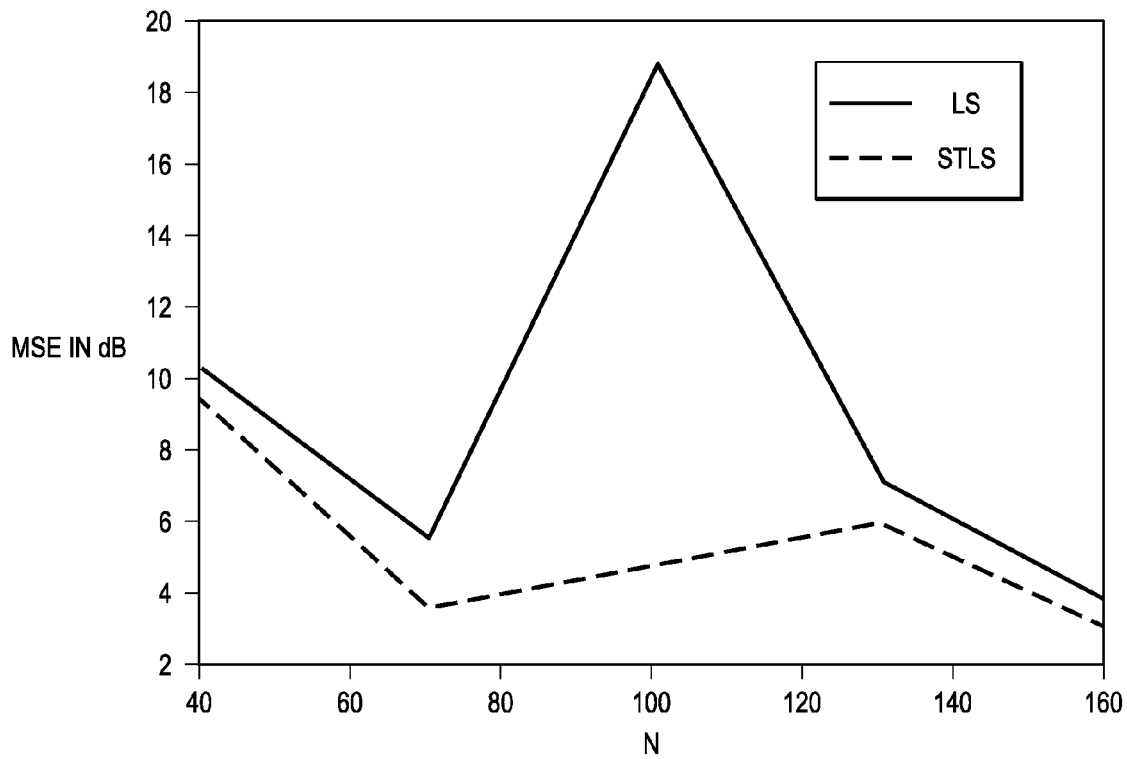
FIG. 6 is a graph showing a performance comparison of LS and STLS techniques for ill-conditioned channels ($\theta=\pi/10$, $\delta=\pi/5$) and different data sizes N at an SNR of 5 dB.

For ill-conditioned channels, the STLS technique also proves to be more data-efficient. FIG. 6 is a graph showing a performance comparison of LS and STLS techniques for ill-conditioned channels ($\theta=\pi/10$, $\delta=\pi/5$) and different data sizes N at an SNR of 5 dB.

Those skilled in the art to which the invention relates will appreciate that other and further additions, deletions, substitutions and modifications may be made to the described embodiments without departing from the scope of the invention.

What is claimed is:

1. A system for blind identification of multichannel finite impulse response filters, comprising:
   a decomposition generator configured to construct, from noisy symbols containing data, a block-Hankel structured matrix and a decomposition thereof;
   an iterative matrix re-estimator coupled to said decomposition generator and configured iteratively to re-estimate singular vectors corresponding to a scalar that satisfies said block-Hankel matrix until a sufficient convergence occurs;
   a structured low-rank estimate matrix generator coupled to said iterative matrix re-estimator and configured to generate a block-Hankel structured low-rank estimate matrix related to said block-Hankel structured matrix; and
   a structured total least-squares (STLS) channel estimator coupled to said structured low-rank estimate matrix generator and configured to obtain STLS channel estimates from said block-Hankel structured low-rank estimate matrix.

2. The system as recited in claim 1 wherein said decomposition is a QR decomposition.

3. The system as recited in claim 1 wherein said iterative matrix re-estimator is further configured to compute an eigenvector corresponding to the smallest eigenvalue of said block-Hankel matrix to yield initial estimates for said singular vectors.

4. The system as recited in claim 1 wherein said iterative matrix re-estimator is further configured to use arbitrary vectors resulting from said decomposition to re-estimate said singular vectors.

5. The system as recited in claim 4 wherein said iterative matrix re-estimator is further configured to use said re-estimated singular vectors to re-estimate symmetric positive definite matrices related to the decomposition until said sufficient convergence occurs.

6. The system as recited in claim 5 wherein said decomposition is a QR decomposition.

7. The system as recited in claim 1 wherein a channel compensator associated with said system is configured to use said STLS channel estimates to remove at least some channel-induced noise from said noisy symbols.

8. A method of blind identification of multichannel finite impulse response filters in an apparatus, comprising:
   constructing a block-Hankel structured matrix and a decomposition thereof from noisy symbols containing data;
   iteratively re-estimating singular vectors corresponding to a scalar that satisfies said block-Hankel matrix until a sufficient convergence occurs;
   generating a block-Hankel structured low-rank estimate matrix related to said block-Hankel structured matrix; and
   obtaining structured total least-squares (STLS) channel estimates from said block-Hankel structured low-rank estimate matrix.

9. The method as recited in claim 8 wherein said decomposition is a QR decomposition.

10. The method as recited in claim 8 further comprising computing an eigenvector corresponding to the smallest eigenvalue of said block-Hankel matrix to yield initial estimates for said singular vectors.

11. The method as recited in claim 8 wherein said iteratively re-estimating comprises using arbitrary vectors resulting from said decomposition to re-estimate said singular vectors.

12. The method as recited in claim 11 wherein said iteratively re-estimating comprises using said re-estimated singular vectors to re-estimate symmetric positive definite matrices related to the decomposition until said sufficient convergence occurs.

13. The method as recited in claim 12 wherein said decomposition is a QR decomposition.

14. The method as recited in claim 8 further comprising using said STLS channel estimates to remove at least some channel-induced noise from said noisy symbols.

15. A method of blind identification of multichannel finite impulse response filters in an apparatus, comprising:
  computing a decomposition of a block-Hankel structured matrix containing noisy data from multiple channels;
  computing an eigenvector corresponding to the smallest eigenvalue of said block-Hankel matrix to yield initial estimates for singular vectors corresponding to a scalar that satisfies said block-Hankel matrix;
  using re-estimated singular vectors to re-estimate symmetric positive definite matrices related to said decomposition until sufficient convergence occurs; and
  generating a block-Hankel structured low-rank estimate matrix related to said block-Hankel structured matrix.

16. The method as recited in claim 15 wherein said decomposition is a QR decomposition.

17. The method as recited in claim 15 further comprising constructing said block-Hankel structured matrix.

18. The method as recited in claim 15 wherein said scalar is a smallest scalar.

19. The method as recited in claim 15 further comprising using arbitrary vectors resulting from said QR decomposition to re-estimate said singular vectors.

20. The method as recited in claim 15 further comprising obtaining structured total least-squares (STLS) channel estimates from said block-Hankel structured low-rank estimate matrix.

* * * * *